UNITED STATES PATENT OFFICE.

JOHN N. CAROTHERS, OF WASHINGTON, DISTRICT OF COLUMBIA, ASSIGNOR TO NEWTON D. BAKER, SECRETARY OF WAR, TRUSTEE.

FERTILIZER AND PROCESS FOR MAKING SAME.

1,350,591.   Specification of Letters Patent.   Patented Aug. 24, 1920.

No Drawing.   Application filed January 14, 1920.   Serial No. 351,440½.

(FILED UNDER THE ACT OF MARCH 3, 1883, 22 STAT. L., 625.)

*To all whom it may concern:*

Be it known that I, JOHN N. CAROTHERS, a citizen of the United States, residing at Washington, in the District of Columbia, have invented a new and useful Improvement in Fertilizers and Processes for Making Same, of which the following is a specification; and the invention described herein, if patented, may be used by the Government, or any of its officers or employees in prosecution of work for the Government, or by any other person in the United States, without the payment to him of any royalty thereon.

This invention relates to the production of fertilizers containing available nitrogen and phosphates and has for its objects the utilization of phosphate rock, nitric acid and lime nitrogen (calcium cyanamid) in said production in order to produce a relatively non-hygroscopic fertilizer in which the phosphate ingredient exists essentially as di-calcium phosphate, and which product is relatively non-corrosive to the skin and to leather belting, is non-dusting and substantially innocuous to the health of the workmen.

Many attempts have been made to render the insoluble tri-calcium phosphate available by the use of various acids. Nitric acid and hydrochloric acid have been tried, in an effort to replace sulfuric, but the latter has proved to be the most satisfactory because the calcium sulfate formed is not only a dehydrating agent, but is also sparingly soluble in dilute solutions of phosphoric acid. Special attention in this connection is directed to United States Patents 872,757; 1,011,909; 1,058,145; 1,196,910 and 1,275,276. It is significant that none of these processes, in so far as I have been able to ascertain, has ever been commercially successful, notwithstanding the fact that even as long ago as 1868 the treatment of phosphate rock with nitric acid, in order to produce nitrate of lime and mono-basic phosphate of lime, was described by Horsford in his Patent #77,271.

My investigations have led to the discovery that a fertilizer possessing all of the above noted desirable properties can be economically produced from the aforesaid raw materials in the following manner:

Phosphate rock is first treated with a combining weight of nitric acid required to produce mono-calcium (*i. e.,* water-soluble) phosphate, in accordance with the following equation:

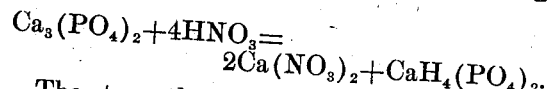

$$Ca_3(PO_4)_2 + 4HNO_3 = 2Ca(NO_3)_2 + CaH_4(PO_4)_2.$$

The strength of the acid employed should range preferably from about 47% to 65%, for example about 50% strength is found to give excellent results. If the strength of the acid substantially exceeds 65% there are very appreciable losses of nitrogen in the form of oxids during the reaction, as when the strength of the acid falls below 47% not only does the reaction proceed with extreme slowness but there is such a large quantity of the water present in the mixture that there will be an appreciable loss of nitrogen as ammonia when the lime nitrogen is added in the next stage of the process hereinafter described.

After the aforesaid reaction is completed, sufficient lime nitrogen is added to the said mixture of calcium nitrate and mono-calcium phosphate to furnish the quantity of lime required to convert such mono-calcium phosphate to the di-calcium, (*i. e.* citrate-soluble phosphate), according to the following equation:

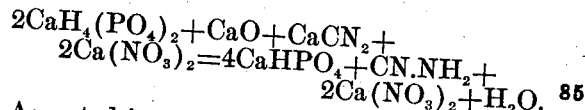

$$2CaH_4(PO_4)_2 + CaO + CaCN_2 + 2Ca(NO_3)_2 = 4CaHPO_4 + CN.NH_2 + 2Ca(NO_3)_2 + H_2O.$$

As noted in the above equation, the calcium nitrate will pass through the reaction entirely unaffected chemically by the calcium cyanamid, but the physical characteristics of such calcium nitrate will be materially modified in that the products of the reaction of the lime nitrogen on the mono-calcium phosphate will serve to destroy or greatly hinder the tendency of the calcium nitrate to deliquesce, thus admitting of the storing and handling of the resultant product in bags. Also, the calcium nitrate, which is ordinarily highly objectionable, because of being corrosive to the skin and to leather belting, shoes and the like, is rendered innocuous while still preserving its value as a fertilizer material.

My improved product is highly adapted for the use of mixed fertilizers since the phosphoric acid content approximates that of acid phosphate, while the nitrogen content approximates that of cotton seed meal, thus rendering it a suitable base for almost any desired "mix". Furthermore, when so used, the absence of free lime prevents a reversion of the phosphatic material to insoluble form. Moreover, the fact that the aforesaid product contains nitrogen in two forms, one of which is immediately available and the other of which is more slowly available, is another extremely desirable feature. Such product is readily obtained in granules of about the size of a pea or of such size as may be found most convenient and efficient for application in practice and is withal tough and essentially non-dusting.

During the addition of the lime nitrogen and the ensuing reaction, the temperature is maintained below the point at which serious decomposition of cyanamid into dicyandiamid or ammonia occurs, preferably at about 60° C. This is accomplished in whole or in part by gradually adding the fine dust-like lime nitrogen with constant agitation or by positive cooling of the mass in accordance with well known cooling methods.

The invention described herein may be used by the Government, or by any other person in the United States, without payment of any royalty thereon.

Having thus described my invention, what I claim and desire to secure by Letters Patent is:

1. The process of making a fertilizer which consists in subjecting calcium phosphate to the action of a concentrated solution of nitric acid having a nitric acid content in excess of 40%, by weight, to form mono-calcium phosphate and calcium nitrate and then adding sufficient calcium cyanamid containing free lime to substantially convert said mono-calcium phosphate to di-calcium phosphate.

2. The process of making a fertilizer which consists in subjecting calcium phosphate to the action of a concentrated solution of nitric acid having a nitric acid content in excess of 40% and not exceeding 70%, by weight, to form mono-calcium phosphate and calcium nitrate and then adding sufficient calcium cyanamid containing free lime to substantially convert said mono-calcium phosphate to di-calcium phosphate.

3. The process of making fertilizer which consists in subjecting calcium phosphate to the action of a concentrated solution of nitric acid having a nitric acid content of about 50%, by weight, to form mono-calcium phosphate and calcium nitrate and then adding sufficient calcium cyanamid containing free lime to substantially convert said mono-calcium phosphate to di-calcium phosphate.

4. The herein described fertilizer product, comprising a phosphate, which is essentially citrate-soluble di-calcium phosphate, calcium nitrate and cyanamid, said product being granular substantially non-dusting and not objectionably deliquescent.

5. The herein described fertilizer product, comprising citrate-soluble di-calcium phosphate, calcium nitrate and cyanamid in the relative proportions of about between three and five molecules of such phosphate, between one and three molecules of calcium nitrate and between one-half and two molecules of cyanamid ($CN.NH_2$), said product being substantially non-dusting and not objectionably deliquescent.

6. The herein described fertilizer product, comprising citrate-soluable di-calcium phosphate in the relative proportions of about four molecules of the first, about two molecules of the second and about one molecule of the third named ingredient, said product being essentially non-dusting and not objectionably deliquescent.

Signed at Anniston in the State of Alabama, this 29th day of November, 1919.

JOHN N. CAROTHERS.